(12) United States Patent
Chan

(10) Patent No.: US 11,418,110 B2
(45) Date of Patent: Aug. 16, 2022

(54) POWER CONVERTER AND RELATED POWER FACTOR CORRECTION CIRCUIT CAPABLE OF IMPROVING ZERO-CROSSING DISTORTION

(71) Applicant: ACER INCORPORATED, New Taipei (TW)

(72) Inventor: Tzu-Tseng Chan, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 17/203,737

(22) Filed: Mar. 16, 2021

(65) Prior Publication Data
US 2022/0060103 A1 Feb. 24, 2022

(30) Foreign Application Priority Data
Aug. 24, 2020 (TW) .................................. 109128754

(51) Int. Cl.
*H02M 3/158* (2006.01)
*H02M 1/00* (2006.01)
*H02M 1/42* (2007.01)

(52) U.S. Cl.
CPC ....... *H02M 1/4225* (2013.01); *H02M 3/1588* (2013.01); *H02M 1/0016* (2021.05); *H02M 1/0058* (2021.05)

(58) Field of Classification Search
CPC ....... H02M 3/158–1588; H02M 1/4225–4233; H02M 1/0016–0022; H02M 1/0058
See application file for complete search history.

(56) References Cited

U.S. PATENT DOCUMENTS

| | | | | |
|---|---|---|---|---|
| 5,900,701 A | * | 5/1999 | Guhilot | H05B 41/2886 315/307 |
| 6,034,489 A | * | 3/2000 | Weng | H02M 1/4258 315/307 |
| 10,581,321 B1 | * | 3/2020 | Xiong | H02M 3/3353 |
| 10,707,746 B1 | * | 7/2020 | Xiong | H02M 1/4225 |
| 2003/0063480 A1 | * | 4/2003 | Morita | H02M 1/34 363/37 |

(Continued)

FOREIGN PATENT DOCUMENTS

| | | | |
|---|---|---|---|
| CN | 103368372 B | * | 4/2016 |
| CN | 106208668 B | * | 7/2019 |

(Continued)

OTHER PUBLICATIONS

Ray L. Lin et al., Improved Soft-Switching ZVT Converters with Active Snubber, 1998 IEEE, pp. 1063-1069, IEEE, XP010263723, 1998.

*Primary Examiner* — Sisay G Tiku
(74) *Attorney, Agent, or Firm* — Winston Hsu

(57) ABSTRACT

A power factor calibration circuit includes a multiplier, a boost inductor, an auxiliary winding, a detection resistor, a compensation capacitor, a comparator, and an auxiliary switch. The comparator is configured to detect inductor current flowing through the boost inductor. When the detected inductor current is too small, the energy stored in the compensation capacitor is transmitted to the auxiliary winding for generating compensation current, thereby enhancing the level of the inductor current.

16 Claims, 4 Drawing Sheets

(56) References Cited

U.S. PATENT DOCUMENTS

| | | | |
|---|---|---|---|
| 2007/0103949 A1* | 5/2007 | Tsuruya | H02M 1/4225 |
| | | | 363/125 |
| 2008/0246444 A1 | 10/2008 | Shao | |
| 2010/0246226 A1* | 9/2010 | Ku | H02M 1/4225 |
| | | | 363/126 |
| 2012/0075889 A1* | 3/2012 | Sasaki | H02M 1/4225 |
| | | | 363/21.09 |
| 2016/0036319 A1* | 2/2016 | Katsumata | H02M 1/4208 |
| | | | 363/126 |
| 2019/0081553 A1* | 3/2019 | Sugimoto | H02M 7/217 |
| 2019/0305671 A1* | 10/2019 | Matsuura | H02M 1/4208 |

FOREIGN PATENT DOCUMENTS

| | | | | |
|---|---|---|---|---|
| EP | 1298779 A2 * | 4/2003 | | H02M 1/4258 |
| JP | 3163656 B2 * | 5/2001 | | |
| JP | 2005245127 A * | 9/2005 | | |
| WO | WO-2004095682 A1 * | 11/2004 | | H02M 1/4208 |

* cited by examiner

POWER CONVERTER AND RELATED POWER FACTOR CORRECTION CIRCUIT CAPABLE OF IMPROVING ZERO-CROSSING DISTORTION

CROSS REFERENCE TO RELATED APPLICATION

This application claims priority of Taiwan Application No. 109128754 filed on 2020 Aug. 24.

BACKGROUND OF THE INVENTION

1. Field of the Invention

The present invention is related to a power converter and related power factor correction circuit, and more particularly, to a power converter and related power factor correction circuit capable of improving zero-crossing distortion.

2. Description of the Prior Art

Power supply circuits are commonly used to convert alternative-current (AC) power into direct-current (DC) voltages for driving various components in a computer system which may have different operating voltages.

The unlimited extraction of natural resources and the consequences of overlooking the environmental costs of such behavior have made more and more people aware of the importance of eco-design measures. Many frameworks have been established for the setting of eco-design requirements for energy-using products, such as consumer electronics, office equipment, household appliances, or power supplies. For example, Energy Star is a program run by the U.S. Environmental Protection Agency (EPA) and U.S. Department of Energy (DOE) that promotes energy efficiency. The program provides information on the energy consumption of products and devices using different standardized methods.

FIG. 1 is a diagram illustrating a prior art power converter 100. The power converter 100 includes a rectifying circuit 10, a boost inductor L0, a power switch Q1, an output diode $D_{OUT}$, and an output capacitor $C_{OUT}$. The rectifying circuit 10 is configured to convert an AC voltage $V_{AC}$ provided by AC mains into a DC output voltage $V_{OUT}$ for driving a load. The value of the output voltage $V_{OUT}$ may be appropriately adjusted by controlling the power switch Q1 so that the inductor current $I_L$ flowing through the boost inductor L0 follows the waveform of the output voltage $V_{OUT}$, thereby allowing the power converter 100 to operate with a high power factor. The power factor, expressed as a percentage, is an indicator of the amount of total current that can be used to create work (active power). The closer the power factor is to 1.00 (100%), the lower the amount of current needed to do said work. Therefore, a higher power factor is generally desirable in a power delivery system to reduce losses and improve voltage regulation at the load.

FIG. 2 is a diagram illustrating signals associated the operation of the prior art power converter 100. When the value of the output voltage $V_{OUT}$ is too small, the peak value of the corresponding inductor current $I_L$ is unable to follow the waveform of the output voltage $V_{OUT}$, as depicted by the period between T0 and T1 and the period between T2 and T3. This kind of zero-crossing distortion reduces the power factor of the power converter 100 which may thus fail to meet associated energy regulations. Therefore, there is a need for a power converter capable of improving zero-crossing distortion.

SUMMARY OF THE INVENTION

The present invention also provides a power converter which improves zero-crossing distortion. The power converter includes an input end for receiving an input voltage, an output end for outputting an output voltage, and a power factor calibration circuit. The power factor calibration circuit includes a multiplier, a coupled inductor unit, a detecting resistor, a compensation capacitor, a comparator and an auxiliary switch. The multiplier is configured to receive the input voltage and a dividing voltage associated with the output voltage, and provide a rectifying instruction voltage by multiplying the input voltage and the dividing voltage. The coupled inductor unit includes a boost inductor having a first end and a second end, and configured to conduct inductor current according to the rectifying instruction voltage; a first auxiliary winding including a first dotted terminal coupled to the first end of the boost inductor and a first undotted terminal coupled to the input voltage; and a second auxiliary winding including a second dotted terminal and a second undotted terminal. The detecting resistor includes a first end coupled to the second end of the boost inductor and a second end coupled to the second dotted terminal. The compensation capacitor includes a first end coupled to receive energy associated with the input voltage, and a second end coupled to a ground level. The comparator includes a positive input end coupled to receive the dividing voltage; a negative input end coupled between the boost inductor and the detecting resistor for receiving a detecting voltage; and an output end for outputting a first control signal according to a value of the dividing voltage and a value of the detecting voltage. The auxiliary switch, includes a first end coupled to the second undotted terminal; a second end coupled to the first end of the compensation capacitor; and a control end coupled to the output end of the comparator for receiving the first control signal.

The present invention also provides a power factor calibration circuit which improves zero-crossing distortion. The power factor calibration circuit includes a multiplier, a coupled inductor unit, a detecting resistor, a compensation capacitor, a comparator and an auxiliary switch. The multiplier is configured to receive the input voltage and a dividing voltage associated with the output voltage, and provide a rectifying instruction voltage by multiplying the input voltage and the dividing voltage. The coupled inductor unit includes a boost inductor having a first end and a second end, and configured to conduct inductor current according to the rectifying instruction voltage; a first auxiliary winding, including a first dotted terminal coupled to the first end of the boost inductor and a first undotted terminal coupled to the input voltage; a second auxiliary winding including a second dotted terminal and a second undotted terminal. The detecting resistor includes a first end coupled to the second end of the boost inductor and a second end. The compensation capacitor includes a first end coupled to receive energy associated with the input voltage, and a second end coupled to a ground level. The comparator includes a positive input end coupled to receive the dividing voltage; a negative input end coupled between the boost inductor and the detecting resistor for receiving a detecting voltage; and an output end for outputting a control signal according to a value of the dividing voltage and a value of the detecting voltage. The auxiliary switch includes a first end coupled to the second undotted terminal, a second end coupled to the first end of the compensation capacitor, and a control end coupled to the output end of the comparator for receiving the control signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
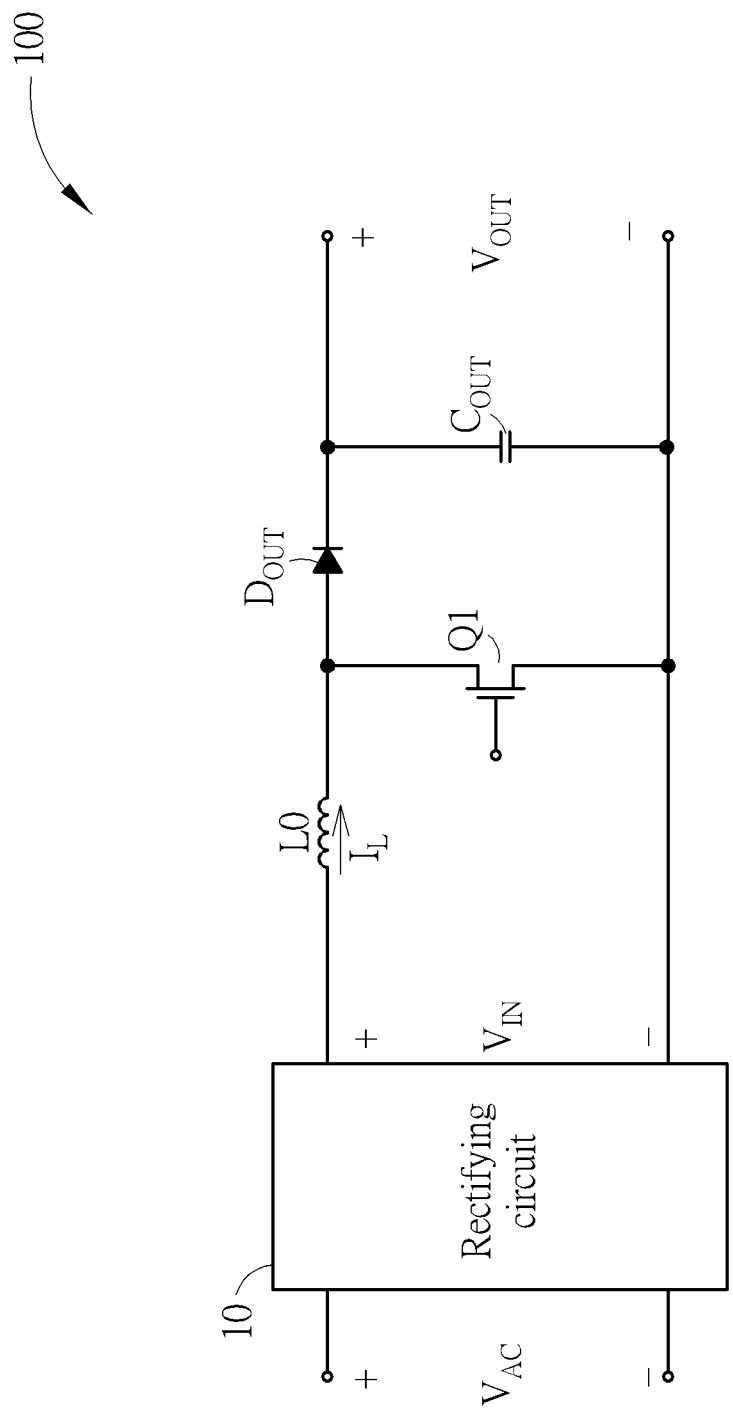
FIG. 1 is a diagram illustrating a prior art power converter.
Figure 2:
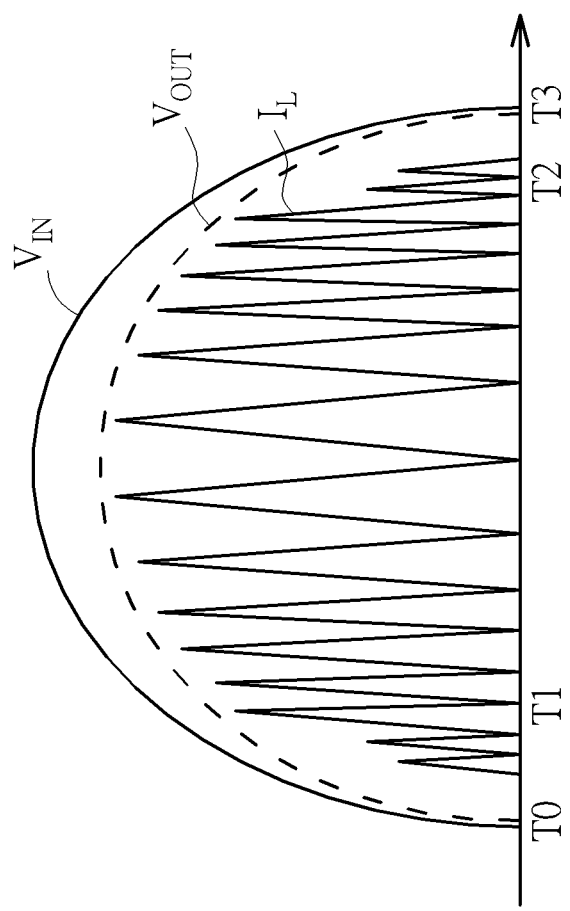
FIG. 2 is a diagram illustrating signals associated the operation of a prior art power converter.
Figure 3:
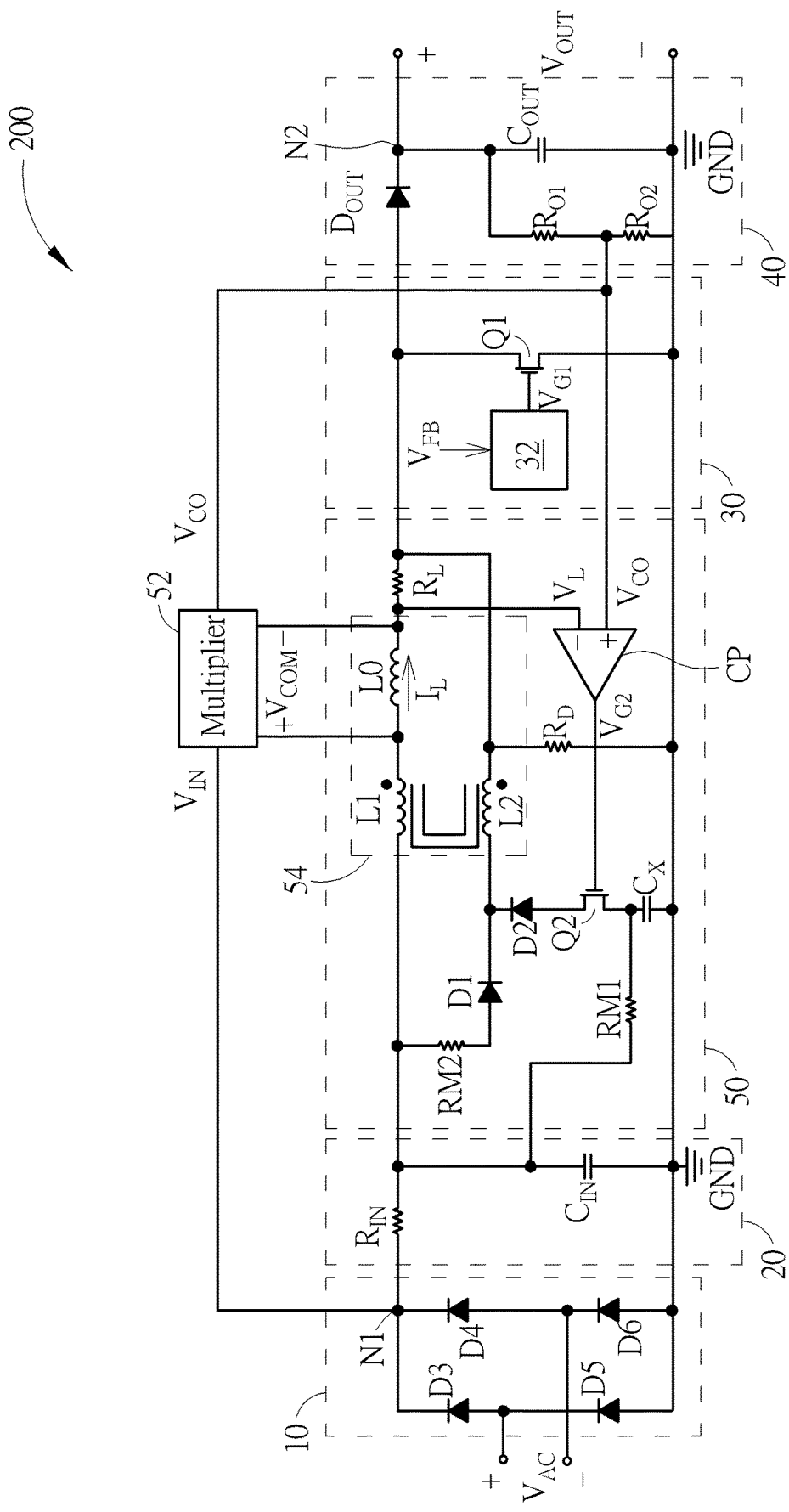
FIG. 3 is a functional diagram illustrating a power converter capable of improving zero-crossing distortion according to an embodiment of the present invention.

FIG. 3 is a functional diagram illustrating a power converter 200 capable of improving zero-crossing distortion according to an embodiment of the present invention. The power converter 200 includes a rectifying circuit 10, an input circuit 20, a switching circuit 30, an output circuit 40 and a power factor calibration circuit 50. The power converter 200 is configured to convert an AC voltage $V_{AC}$ provided by AC mains into an output voltage $V_{OUT}$ for driving a load (not shown in FIG. 3). The DC input end of the power converter 200 is denoted by N1, and the DC output end of the power converter 200 is denoted by N2.

In an embodiment, the rectifying circuit 10 may be implemented as a bridge rectifier which includes diodes D3-D6 and is configured to convert the AC voltage $V_{AC}$ provided by AC mains into a DC input voltage $V_{IN}$ on the input end N1. However, the implementation of the rectifying circuit 10 does not limit the scope of the present invention.

The input circuit 20 includes an input resistor $R_{IN}$ and an input capacitor $C_{IN}$ coupled in series between the input end N1 and a ground level GND. The input voltage $V_{IN}$ may charge the input capacitor $C_{IN}$ via the input resistor $R_{IN}$, and serves as the first input voltage of the power factor calibration circuit 50.

The switching circuit includes a power switch Q1 and a control circuit 32. The output circuit 40 includes an output capacitor $C_{OUT}$, an output diode $D_{OUT}$, and output resistors $R_{O1}$ and $R_{O2}$. The power switch Q1 includes a first end coupled to the output end N2 via the output diode $D_{OUT}$, a second end coupled to the ground level GND, and a control end coupled to the control circuit 32 for receiving a control signal $V_{G1}$. The output diode $D_{OUT}$ includes an anode coupled to the power factor calibration circuit 50 and a cathode coupled to the output end N2. The output capacitor $C_{OUT}$ is coupled between the output end N2 and the ground level GND. The output resistors $R_{O1}$ and $R_{O2}$ are coupled in series between the output end N2 and the ground level GND.

In an embodiment, the control circuit may be implemented as a pulse width modulation (PWM) circuit configured to provide the control signal $V_{G1}$ and adjust the duty cycle of the control signal $V_{G1}$ according a feedback voltage $V_{FB}$, thereby selectively turning on or off the power switch, wherein the value of feedback voltage $V_{FB}$ is associated with the value the output voltage $V_{OUT}$.

The power factor calibration circuit 50 includes a multiplier 52, a coupled inductor unit 54, a comparator CP, a detecting resistor $R_L$, an auxiliary switch Q2, a compensation capacitor Cx, current-limiting resistors RM1 and RM2, a discharge resistor $R_D$, and diodes D1 and D2. The coupled inductor unit 54 includes a boost inductor L0 and auxiliary windings L1-L2. When the power switch Q1 is turned on, the anode of the output diode $D_{OUT}$ is pulled down to the ground level GND, and the reversed-biased output diode $D_{OUT}$ is thus cut off. Under such circumstance, the boost inductor L0 is charged by the input voltage $V_{IN}$, and the output voltage $V_{OUT}$ is supplied by the energy stored in the output capacitor $C_{OUT}$. When the power switch Q1 is turned off, as the inductor current $I_L$ outputted by the power factor calibration circuit 50 exceeds 0, the output diode $D_{OUT}$ is forward-biased and thus turned on. Under such circumstance, the output capacitor $C_{OUT}$ is charged by the input voltage $V_{IN}$ and the energy stored in the boost inductor L0, thereby supplying the output voltage $V_{OUT}$. Meanwhile, the output resistors $R_{O1}$ and $R_{O2}$ form a voltage-dividing circuit which provides a dividing voltage $V_{CO}$ associated with the output voltage $V_{OUT}$.

In the coupled inductor unit 54, the boost inductor includes a first end and a second end, and is configured to conduct the inductor current $I_L$ according to a rectifying instruction voltage $V_{COM}$. The first auxiliary winding L1 includes a first dotted terminal coupled to the first end of the boost inductor L0, and a first undotted terminal coupled to the input voltage $V_{IN}$ via the input resistor $R_{IN}$. The second auxiliary winding L2 includes a second dotted terminal coupled to the output end N2 via the output diode $D_{OUT}$ and coupled to the ground level GND via the discharge resistor $R_D$, and a second undotted terminal coupled to the cathodes of the diodes D1-D2. The multiplier 52 includes a first input end coupled to the input end N1 for receiving the input voltage $V_{IN}$, and a second input end coupled between the output resistors $R_{O1}$ and $R_{O2}$ for receiving the dividing voltage $V_{CO}$. The multiplier 52 is configured to provide the rectifying instruction voltage $V_{COM}$ by multiplying the input voltage $V_{IN}$ and the dividing voltage $V_{CO}$. The rectifying instruction voltage $V_{COM}$ is established across both ends of the boost inductor L0 so that the inductor current $I_L$ flowing through the boost inductor L0 may follow the waveform of the output voltage $V_{OUT}$. The detecting resistor $R_L$ includes a first end coupled to the boost inductor V0 and a second end coupled to the anode of the output diode $D_{OUT}$, and is configured to provide a detecting voltage $V_L$ associated with the inductor current $I_L$.

The auxiliary switch Q1 includes a first end coupled to the input end N1 sequentially via the diode D2, the diode D1, the current-limiting resistor RM2 and the input resistor $R_{IN}$, a second end coupled to the ground level GND via the compensation capacitor Cx, and a control end coupled to receive a control signal $V_{G2}$. The current-limiting resistor RM1 includes a first end coupled between the input resistor $R_{IN}$ and the input capacitor $C_{IN}$, and a second end coupled between the second end of the auxiliary switch Q2 and the compensation capacitor Cx. The input voltage $V_{IN}$ may charge the input capacitor $C_{IN}$ via the input resistor $R_{IN}$. The energy stored in the input capacitor $C_{IN}$ may charge the compensation capacitor Cx via the current-limiting resistor RM1.

The comparator CP includes a positive input end coupled between the output resistors $R_{O1}$ and $R_{O2}$ for receiving the dividing voltage $V_{CO}$, a negative input end coupled between the boost inductor L0 and the detecting resistor $R_L$ for receiving the detecting voltage $R_L$, and an output end for outputting the control signal $V_{G2}$. As previously stated, the inductor current $I_L$ may fail to follow the waveform of the voltage $V_{COM}$, thereby causing zero-crossing distortion. Therefore, in the present invention, the comparator CP in the power factor calibration circuit 50 is used to determine whether the value of the inductor current $I_L$ becomes too small and perform current compensation accordingly.

Figure 4:
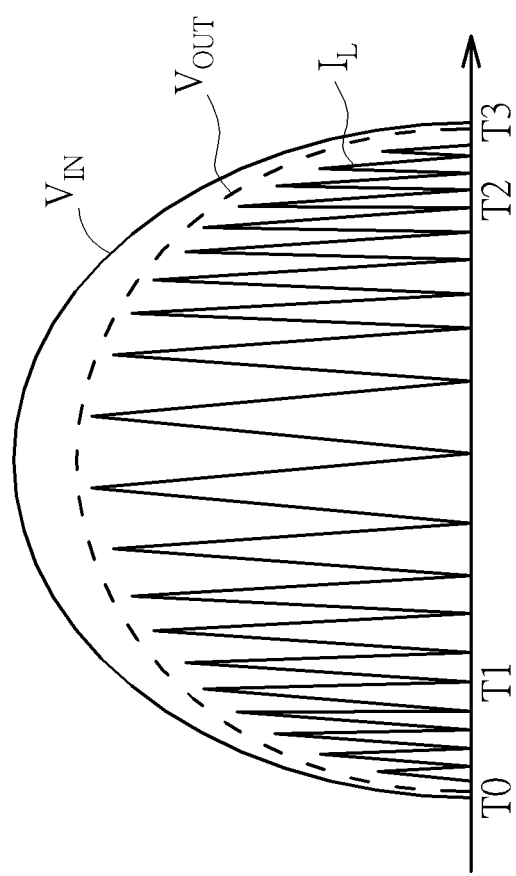
FIG. 4 is a diagram illustrating signals associated the operation of a power converter according to an embodiment of the present invention.

FIG. 4 is a diagram illustrating signals associated the operation of the power converter 200 according to an embodiment of the present invention. For illustrative purposes, it is assumed that the value of the detecting voltage $V_L$ is larger than the value of the dividing voltage $V_{CO}$ during the period between T0 and T1 and the period between T2 and T3, and that the value of the detecting voltage $V_L$ is not larger than the dividing voltage $V_{CO}$ during the period between T1 and T2.

When the value of the detecting voltage $V_L$ (associated with the inductor current $I_L$) is larger than the value of the dividing voltage $V_{CO}$ (associated with the output voltage $V_{OUT}$), it indicates that the value of the corresponding inductor current $I_L$ is sufficient to follow the waveform of the rectifying instruction voltage $V_{COM}$, and the comparator CP thus outputs the control signal $V_{G2}$ having a disable level for turning off the auxiliary switch Q2. Under such circumstance, the energy stored in the compensation capacitor Cx is isolated from the auxiliary winding L2, and the energy stored in the auxiliary winding L2 may be discharged to the ground level GND via the discharge resistor $R_D$, wherein the peak of the inductor current $I_L$ flowing through the boost inductor L0 is represented by $I_{PK}(t)$. During the period when T1≤t≤T2, the peak $I_{PK}(t)$ of the inductor current $I_L$ follows the waveform of the rectifying instruction voltage $V_{COM}$, so that the power converter 200 may operate with a high power factor.

When the value of the detecting voltage $V_L$ (associated with the inductor current $I_L$) is not larger than the value of the dividing voltage $V_{CO}$ (associated with the output voltage $V_{OUT}$), it indicates that the value of the corresponding inductor current $I_L$ may not be sufficient to follow the waveform of the rectifying instruction voltage $V_{COM}$. The comparator CP thus outputs the control signal $V_{G2}$ having an enable level for turning on the auxiliary switch Q2, thereby allowing the energy stored in the input capacitor $C_{IN}$ to charge the auxiliary winding L2 via the turned-on auxiliary switch Q2 and the forward-biased diode D2. Under such circumstance, the auxiliary winding L2 generates inductor current in response to the energy from the compensation capacitor Cx, and the inductor current is then induced to the auxiliary winding L1 for generating the inductor current $I_L$, thereby raising the inductor current $I_L$ flowing through the boost inductor L0. During the periods when T0≤t≤T1 and T2≤t≤T3, the sum of the peak $I_{PK}(t)$ of the inductor current $I_L$ and the inductor current $I_L$ follows the waveform of the rectifying instruction voltage $V_{COM}$, so that the power converter 200 may operate with a high power factor.

In the power factor calibration circuit 50, the diode D1 is introduced for preventing the energy stored in the compensation capacitor Cx to be discharged into the input end N1. Also, the diode D2 is introduced for preventing the energy stored in the compensation capacitor Cx to be discharged into the auxiliary winding L2.

In the present invention, the value of the inductor current $I_L$ may be determined by the number of turns N1 in the auxiliary winding L1 and the number of turns N2 in the auxiliary winding L2. In an embodiment, the ratio of N1 and N2 may be 5:5. However, the number of turns in the auxiliary winding L1 or L2 does not limit the scope of the present invention.

In an embodiment of the present invention, the value of the input capacitor $C_{IN}$ may be 120 μF (within ±1% margin), the value of the output capacitor $C_{OUT}$ may be 680 μF*2 (within ±20% margin), the value of the compensation capacitor Cx may be 47 μF (within ±1% margin), the value of the input resistor $R_{IN}$ may be 6KΩ (within ±10% margin), the value of the output resistor $R_{O1}$ may be 7KΩ (within ±5% margin)), the value of the output resistor $R_{O2}$ may be 3KΩ (within ±5% margin), the value of the current-limiting resistor RM1 may be 150KΩ (within ±10% margin), the value of the current-limiting resistor RM2 may be 100KΩ (within ±10% margin), the value of the detecting resistor $R_L$ may be 8KΩ (within ±5% margin), the value of the discharge resistor $R_D$ may be 1KΩ (within ±10% margin), the value of the boost inductor L0 may be 380 μH (within ±10% margin), the value of the auxiliary winding L1 may be 40 μH (within ±10% margin), and the value of the auxiliary winding L2 may be 40 μH (within ±10% margin). However, the values of the above-mentioned devices do not limit the scope of the present invention.

In an embodiment of the present invention, each of the power switch Q1 and the auxiliary switch Q2 may be a metal-oxide-semiconductor field-effect transistor (MOSFET), a bipolar junction transistor (BJT), or another device with similar function. For N-type transistors, the enable level is logic 1 and the disable level is logic 0; for P-type transistors, the enable level is logic 0 and the disable level is logic 1. However, the type of the power switch Q1 or the auxiliary switch Q2 does not limit the scope of the present invention.

In conclusion, the present power supply circuit may perform current compensation according to the inductor current $I_L$, so that the value of the inductor current $I_L$ may vary with the output voltage $V_{OUT}$. Therefore, the present power converter may operate with a high power factor by preventing zero-crossing distortion.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power converter which improves zero-crossing distortion, comprising:
   an input end for receiving an input voltage;
   an output end for outputting an output voltage; and
   a power factor calibration circuit, comprising:
      a multiplier configured to receive the input voltage and a dividing voltage associated with the output voltage, and provide a rectifying instruction voltage by multiplying the input voltage and the dividing voltage;
      a coupled inductor unit, comprising:
         a boost inductor having a first end and a second end, and configured to conduct inductor current according to the rectifying instruction voltage;
         a first auxiliary winding, including:
            a first dotted terminal coupled to the first end of the boost inductor; and
            a first undotted terminal coupled to the input voltage;
         a second auxiliary winding, including:
            a second dotted terminal; and
            a second undotted terminal;

a detecting resistor, including:
  a first end coupled to the second end of the boost inductor; and
  a second end coupled to the second dotted terminal;
a compensation capacitor, including:
  a first end coupled to receive energy associated with the input voltage; and
  a second end coupled to a ground level;
a comparator, including:
  a positive input end coupled to receive the dividing voltage;
  a negative input end coupled between the boost inductor and the detecting resistor for receiving a detecting voltage; and
  an output end for outputting a first control signal according to a value of the dividing voltage and a value of the detecting voltage; and
an auxiliary switch, including:
  a first end coupled to the second undotted terminal;
  a second end coupled to the first end of the compensation capacitor; and
  a control end coupled to the output end of the comparator for receiving the first control signal.

2. The power converter of claim 1, further comprising:
an input resistor, including:
  a first end coupled to the input end; and
  a second end coupled to the first undotted terminal, and coupled between the second end of the auxiliary switch and the compensation capacitor; and
an input capacitor, including:
  a first end coupled to the second end of the input resistor; and
  a second end coupled to the ground level.

3. The power converter of claim 2, wherein the power factor calibration circuit further comprises:
a first current-limiting resistor, including:
  a first end coupled between the second end of the input resistor and the first end of the input capacitor; and
  a second end coupled between the second end of the auxiliary switch and the compensation capacitor; and
a second current-limiting resistor, including:
  a first end coupled to the second end of the input resistor; and
  a second end coupled to the second undotted terminal.

4. The power converter of claim 3, wherein the power factor calibration circuit further comprises:
a first diode, including:
  an anode coupled to the second end of the second current-limiting resistor; and
  a cathode coupled to the second undotted terminal; and
a second diode, including:
  an anode coupled to the first end of the auxiliary switch; and
  a cathode coupled to the second undotted terminal.

5. The power converter of claim 1, wherein the power factor calibration circuit further comprises a discharge resistor coupled between the second dotted terminal and the ground level.

6. The power converter of claim 1, further comprising:
a power switch, including:
  a first end coupled between the detecting resistor and the output end;
  a second end coupled to the ground level; and
  a control end coupled to receive a second control signal; and
a control circuit configured to provide the second control signal according to a feedback voltage associated with the output voltage.

7. The power converter of claim 1, further comprising:
an output capacitor coupled between the output end and the ground level; and
a first output resistor and a second output resistor coupled in series between the output end and the ground level, wherein the positive input end of the comparator is coupled between the first output resistor and the second output resistor for receiving the dividing voltage.

8. The power converter of claim 1, further comprising an output diode which includes: an anode coupled to the second end of the detecting resistor; and a cathode coupled to the output end.

9. A power factor calibration circuit which improves zero-crossing distortion, comprising: a multiplier configured to receive an input voltage and a dividing voltage associated with an output voltage, and provide a rectifying instruction voltage by multiplying the input voltage and the dividing voltage; a coupled inductor unit, comprising: a boost inductor having a first end and a second end, and configured to conduct inductor current according to the rectifying instruction voltage; a first auxiliary winding, including: a first dotted terminal coupled to the first end of the boost inductor; and a first undotted terminal coupled to the input voltage; a second auxiliary winding, including: a second dotted terminal; and a second undotted terminal; a detecting resistor, including: a first end coupled to the second end of the boost inductor; and a second end; a compensation capacitor, including: a first end coupled to receive energy associated with the input voltage; and a second end coupled to a ground level; a comparator, including: a positive input end coupled to receive the dividing voltage; a negative input end coupled between the boost inductor and the detecting resistor for receiving a detecting voltage; and an output end for outputting a first control signal according to a value of the dividing voltage and a value of the detecting voltage; and an auxiliary switch, including: a first end coupled to the second undotted terminal; a second end coupled to the first end of the compensation capacitor; and a control end coupled to the output end of the comparator for receiving the first control signal.

10. The power factor calibration circuit of claim 9, further comprising: a first current-limiting resistor, including: a first end coupled between a second end of an input resistor and a first end of an input capacitor; and a second end coupled between the second end of the auxiliary switch and the compensation capacitor; and a second current-limiting resistor, including: a first end coupled to the input voltage; and a second end coupled to the second undotted terminal.

11. The power factor calibration circuit of claim 10, further comprising:
a first diode, including:
  an anode coupled to the second end of the second current-limiting resistor; and
  a cathode coupled to the second undotted terminal; and
a second diode, including:
  an anode coupled to the first end of the auxiliary switch; and
  a cathode coupled to the second undotted terminal.

12. The power factor calibration circuit of claim 9, further coupled to an input resistor and an input capacitor, wherein:
the input resistor includes:
  a first end for receiving the input voltage; and a second end coupled to the first undotted terminal, and coupled between the second end of the auxiliary switch and the compensation capacitor; and the input capacitor includes:
- a first end coupled to the second end of the input resistor; and
- a second end coupled to the ground level.

13. The power factor calibration circuit of claim 9, further comprising a discharge resistor coupled between the second dotted terminal and the ground level.

14. The power factor calibration circuit of claim 9, further coupled to a power switch and a control circuit, wherein:

the power switch includes:
- a first end coupled to the second end of the detecting resistor;
- a second end coupled to the ground level; and
- a control end coupled to receive a second control signal; and a control circuit configured to provide the second control signal according to a feedback voltage associated with an output voltage.

15. The power factor calibration circuit of claim 9, wherein: the second end of the detecting resistor is coupled to the ground level via an output capacitor; and the positive input end of the comparator is coupled between a first output resistor for receiving the dividing voltage; and the first output resistor and a second output resistor are coupled in series between an output end and the ground level.

16. The power factor calibration circuit of claim 15, wherein an output diode is further coupled between the second end of the detecting resistor and the output capacitor.

* * * * *